United States Patent
Porterfield (10) Patent No.: US 6,301,645 B1
(45) Date of Patent: *Oct. 9, 2001

(54) SYSTEM FOR ISSUING DEVICE REQUESTS BY PROXY

(75) Inventor: A. Kent Porterfield, New Brighton, MN (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,899

(22) Filed: Jan. 20, 1998

(51) Int. Cl.⁷ .................................................. G06F 12/00
(52) U.S. Cl. .................................. 711/206; 711/6; 710/33
(58) Field of Search ................................ 711/203, 6, 165, 711/206; 710/31, 33

(56) References Cited

U.S. PATENT DOCUMENTS

| | | | |
|---|---|---|---|
| 5,014,192 | 5/1991 | Mansfield et al. | 370/452 |
| 5,255,379 | * 10/1993 | Melo | 711/202 |
| 5,317,568 | 5/1994 | Bixby et al. | 370/401 |
| 5,319,760 | * 6/1994 | Mason et al. | 711/208 |
| 5,386,467 | 1/1995 | Ahmad | 379/220 |
| 5,590,285 | 12/1996 | Krause et al. | 709/218 |
| 5,659,798 | * 8/1997 | Blumrich et al. | 710/26 |
| 5,784,707 | * 7/1998 | Khalidi et al. | 711/206 |
| 5,887,190 | 3/1999 | Priem et al. | 710/3 |

* cited by examiner

Primary Examiner—Matthew Kim
Assistant Examiner—Matthew D. Anderson
(74) Attorney, Agent, or Firm—Dorsey & Whitney LLP (57) ABSTRACT

A system for issuing device requests by proxy in a system using distributed control through a multi-port switch. A device issues a request to a central switch indicating the original requester as the source rather than itself. This passes responsibility for the control of the actual data transfer back to the original requester, and the device is no longer involved.

17 Claims, 6 Drawing Sheets

SYSTEM FOR ISSUING DEVICE REQUESTS BY PROXY

This application is related to U.S. Pat. No. 6,067,581.

FIELD OF THE INVENTION

The present invention relates generally to techniques for issuing device requests in a computer system. More particularly, the present invention relates to a system in which a device may issue a device request on behalf of another device.

BACKGROUND OF THE INVENTION

Connectivity between disparate devices within a computer system or between modules in an integrated circuit or ASIC is often accomplished through at least one central switch that is connected to devices on different busses throughout the system. A central switch allows transactions to be routed internally, so that each device is able to access other modules connected to the central switch, without requiring additional ports or unnecessary logic specific to the target resource or target device. For example, a memory control module in a system controller having a central switch may be accessed through this central switch from the interface for the system processor, from a number of busses within the computer system, or perhaps from other devices or modules within the system controller. In order to communicate with this memory control module, other devices connected to the switch only need to communicate with the central switch, which translates requests from the form appropriate for one device to a form suitable for another.

When a request is issued by one device to another, the device that is the source of the request includes two request two tags within the request. These tags identify the source device for the request and the destination device for the request. When a device issues a request to another device, the source or requesting device issues a request to the central switch, identifying itself as the source, and the target device as the destination. The switch then analyzes the tags, performs any necessary translation, and then communicates the request to the target or destination device as identified by the destination tag. Thereafter, the requested operation is performed.

Often the conventional procedure of issuing device requests in such an environment works efficiently. However, in some situations, inefficiencies or redundancies result when the requesting device identifies itself to the switch as the source. These inefficiencies result in increased loads on the central switch, and also in unnecessary demands on some of the devices or other resources within the system. Thus, there exists a need for an efficient system and method for more efficiently issuing requests between devices in a computer system, while also maintaining compatibility with applicable bus standards or other standards, and while not unnecessarily increasing the complexity of devices within the system.

SUMMARY OF THE INVENTION

The present invention relates to techniques for issuing device requests by proxy. In one embodiment of the invention, the invention relates to a computer comprising: (a) a bus; (b) a system controller connected to the bus so that it can access devices on the bus, wherein the system controller comprises a switch that receives requests identifying a source device and a destination device, wherein the switch routes each request to a destination device identified by the request; and (c) a proxy device that is attached to the switch, and that sends a request to the switch identifying a destination device and a source device, wherein the source device is a device that is different from the proxy device.

In another embodiment of the present invention, the present invention relates to a computer comprising: (a) a processor connected to a host bus; (b) system memory connected to a memory bus; (c) a device connected to an expansion bus; and (d) a system controller connected to the host bus, the memory bus, and the expansion bus so that it can access devices on the host bus, the memory bus, and the expansion bus. The system controller comprises: (i) a switch that receives requests identifying a source device and a destination device, wherein the switch routes the requests to the identified destination device, and (ii) a proxy device that is attached to the system controller and that sends a request to the switch identifying a destination device and a source device, wherein the source device is a device that is different than the proxy device.

Additional embodiments and features, and the nature of the present invention may be more clearly understood by reference to the following detailed description of the invention, the appended claims, and to the several drawings herein.

DETAILED DESCRIPTION OF THE INVENTION

Figure 1:
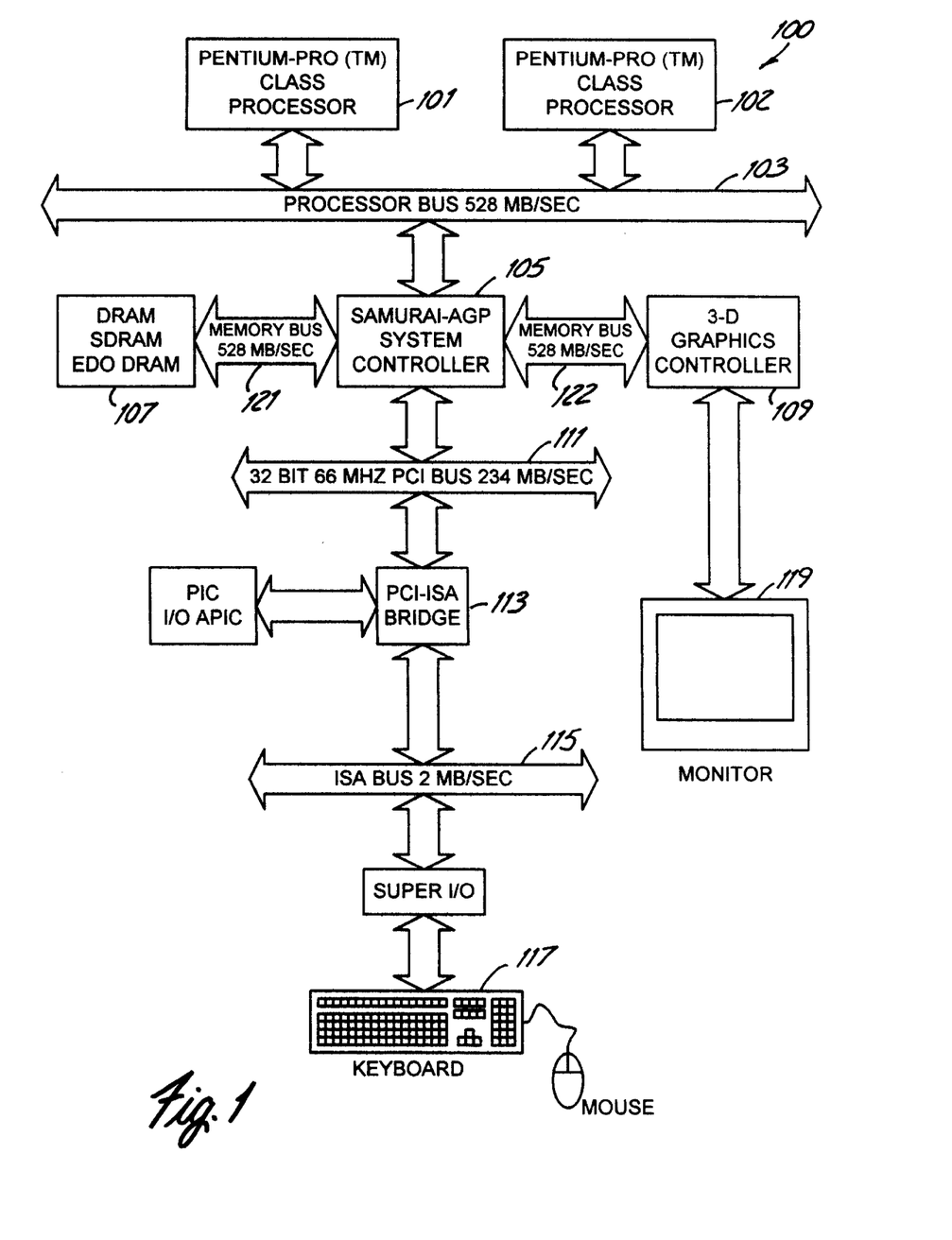
FIG. 1 is a block diagram of a computer system including a central system controller connected to a processor or host bus, system memory, and a graphics controller.

FIG. 1 is a block diagram of a multi-processor computer system 100 having processors 101 and 102 attached to a processor or host bus 103. The computer system 100 has a system controller 105 attached to the processors 101 and 102 through the processor or host bus 103. The system controller 105 is also attached to the system memory 107 through a memory bus 121, and also to a graphics controller 109 through a video or graphics bus 122, such as an Accelerated Graphics Port bus. The graphics controller 109 is used in connection with the monitor 119.

The system controller 105 also is attached to one or more expansion busses, such as the PCI bus 111. As shown in FIG. 1, additional busses can also be included within the system in a hierarchical fashion. For example, the ISA bus 115 is connected to the PCI bus through bridge logic 113.

Figure 2:
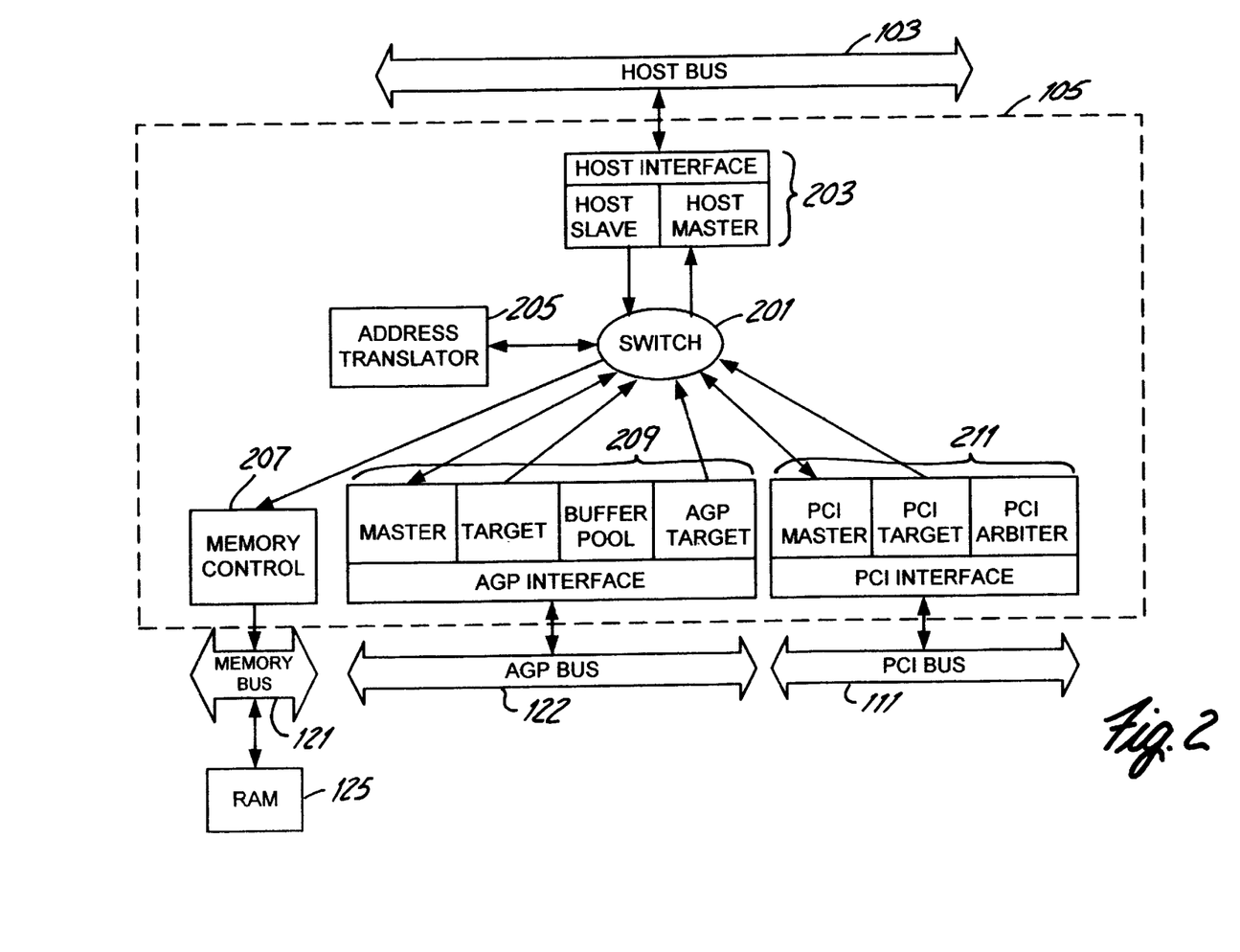
FIG. 2 is a block diagram of the system controller of FIG. 1, including connections to busses outside the system controller.

FIG. 2 is a more detailed block diagram of the system controller 105 of FIG. 1. The system controller 105 includes a central switch 201 which is connected to each of the devices or modules shown in the system controller 105. The host module 203 sits between the host bus 103 and the central switch 201 and handles communication between the bus 103 and the switch 201. Similarly, the switch 201 is also connected to the memory bus 121 through the memory control module 207 within the system controller 105. The system memory 125 is shown on the memory bus 121. The switch 201 is also connected to the AGP bus 122 through the AGP module 209, and the PCI bus 111 and the switch 201 are connected by the PCI module 211 within the system controller 105.

Figure 3:
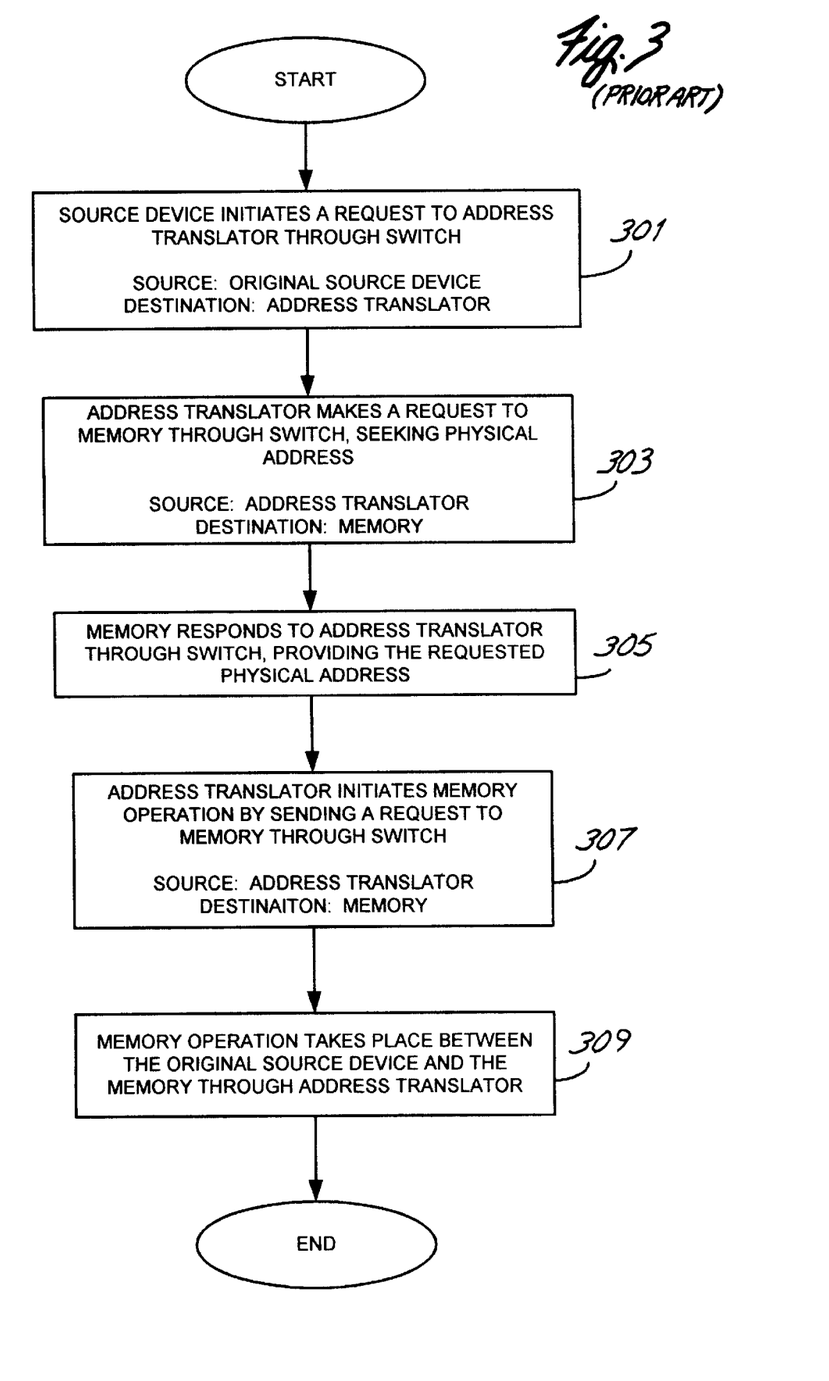
FIG. 3 is flow chart of the operation of a computer system having a central system controller.

FIG. 3 is a flow chart illustrating the conventional operation of a system controller in a system such as that shown in FIGS. 1 and 2. In the example hereinafter described, the Address Translator 205 is responsible for translating a virtual address to a physical address. This is often necessary when a device or module initiates an operation that is directed to the graphics aperture, or virtual memory that is designated for use by the graphics subsystem. The virtual address that may be used by the requesting device is translated into a physical address before the operation is be carried out. The translation of the virtual address to the physical address is typically done with reference to a remapping table. Normally, this table is referred to as the Graphic Address Remapping Table, and it may be stored in system memory 125. In some implementations, when a request or memory operation is directed to the graphics aperture, the Address Translator 205 will look up information in the remapping table, and then supply the targeted physical address. The physical address is used to carry out the memory operation.

At 301, a device (hereinafter referred to as the "original source device") initiates a request to the Address Translator 205 within the system controller 105. This original source device could be the AGP module 209 (specifically, e.g., the AGP target within the AGP module 209). The original source device could also be the PCI module 211, the host module 203, or the original source device could also be another device within the system. The original source device initiates the request to the Address Translator 205 through the switch 201 in FIG. 2. The switch 201 does any necessary translation of the information or request it receives from the original source device, and then passes the request or information to the Address Translator 205. As described earlier, the original source device includes in its request two tags identifying the source and destination of the request. The switch 201 uses these tags to decode which devices are communicating. As shown at 301 in FIG. 3, the source is identified by such tags as the original source device, and the destination is identified as the Address Translator 205.

At 303, the Address Translator 205 makes a request to memory through the switch 201, seeking a physical address that corresponds to a virtual address received from the original source device. Normally, in this request the Address Translator 205 is retrieving information from a remapping table stored in memory 125, which will allow it to perform the translation. Once it has the necessary information from the remapping table in main memory 125, it performs the translation from the virtual address to the physical address. The Address Translator is identified as the source of the request at 303, and the memory control module 207 is identified as the destination of the request.

At 305, the memory responds to the Address Translator 205, and provides the requested information, allowing translation of the virtual address into a physical address. The memory control module 207 responds to the Address Translator through the switch 201, providing it with the requested data. (In some embodiments, the memory 125 itself may effectively perform the translation so that the information retrieved from the memory 125 is the physical address, thereby making any meaningful further translation by the Address Translator 205 unnecessary.)

At 307, once the Address Translator 205 has the physical address, it initiates the memory operation requested by the original source device by sending a request to memory 125 through the switch. The Address Translator 205 is identified as the source of the request, and the memory control module 207 is identified as the destination. Thereafter, the memory operation takes place between the original source device and the memory control module 207 through the Address Translator 205.

Figure 4:
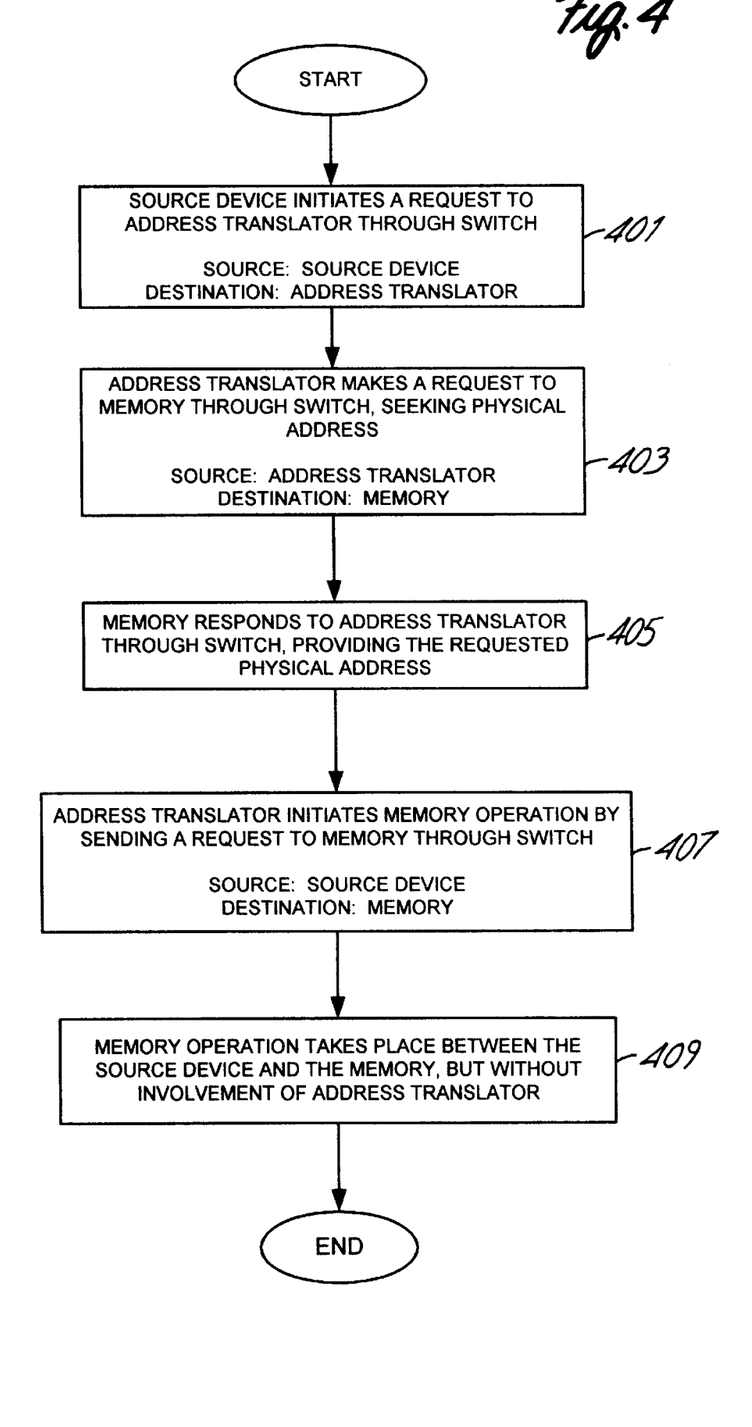
FIG. 4 is a flow chart illustrating the operation of a computer system having a central system controller in which a device request is issued by a device on behalf of another device.

FIG. 4 is flow chart illustrating an embodiment of the present invention wherein the system controller operates differently than is shown in FIG. 3. Specifically, the Address Translator 205 issues a device request on behalf of the original source device. At 401, an original source device initiates a request to the Address Translator 205 through the switch 201 in FIG. 2. The switch 201 does any necessary translation of the information or request it receives from the original source device, and then passes the request or information to the Address Translator 205. As shown at 401 in FIG. 4, the source is identified as the original source device, and the destination is identified as the Address Translator 205.

At 403, the Address Translator 205 makes a request to memory through the switch, seeking a physical address that corresponds to a virtual address received from the original source device, and identifying the Address Translator 205 as the source of the request, and the memory control module 207 as the destination of the request. At 405, the memory responds to the Address Translator 205, and provides the requested physical address or provides information that will enable a translation of the virtual address into the desired physical address. The memory control module 207 responds to the Address Translator 205 through the switch 201, providing it with the requested data.

At 407, the Address Translator 205 initiates the memory operation by sending a request to the memory control module 207 through the switch 201. However, unlike the process illustrated in FIG. 3, the original source device, rather than the Address Translator 205, is identified as the source of the request. In other words, the Address Translator 205 issues a request to the memory control module 207 on behalf of the original source device. The memory control module 207 is identified as the destination of the request. With the procedure of FIG. 4, control of the actual data transfer between the original source device and the memory control module 207 is passed seamlessly from the Address Translator 205 back to the original source device. Thereafter, the memory operation takes place between the original source device and the memory control module 207 without the involvement of the Address Translator 205, whereas in FIG. 3, the Address Translator 205 was involved in the memory operation. Thus, in FIG. 4, the Address Translator 205 issues a request by proxy, and then passes on control responsibility to the original source device. This allows the Address Translator 205 to remove itself from further involvement in the operation, and thereby allows it to perform other tasks.

Figure 5:
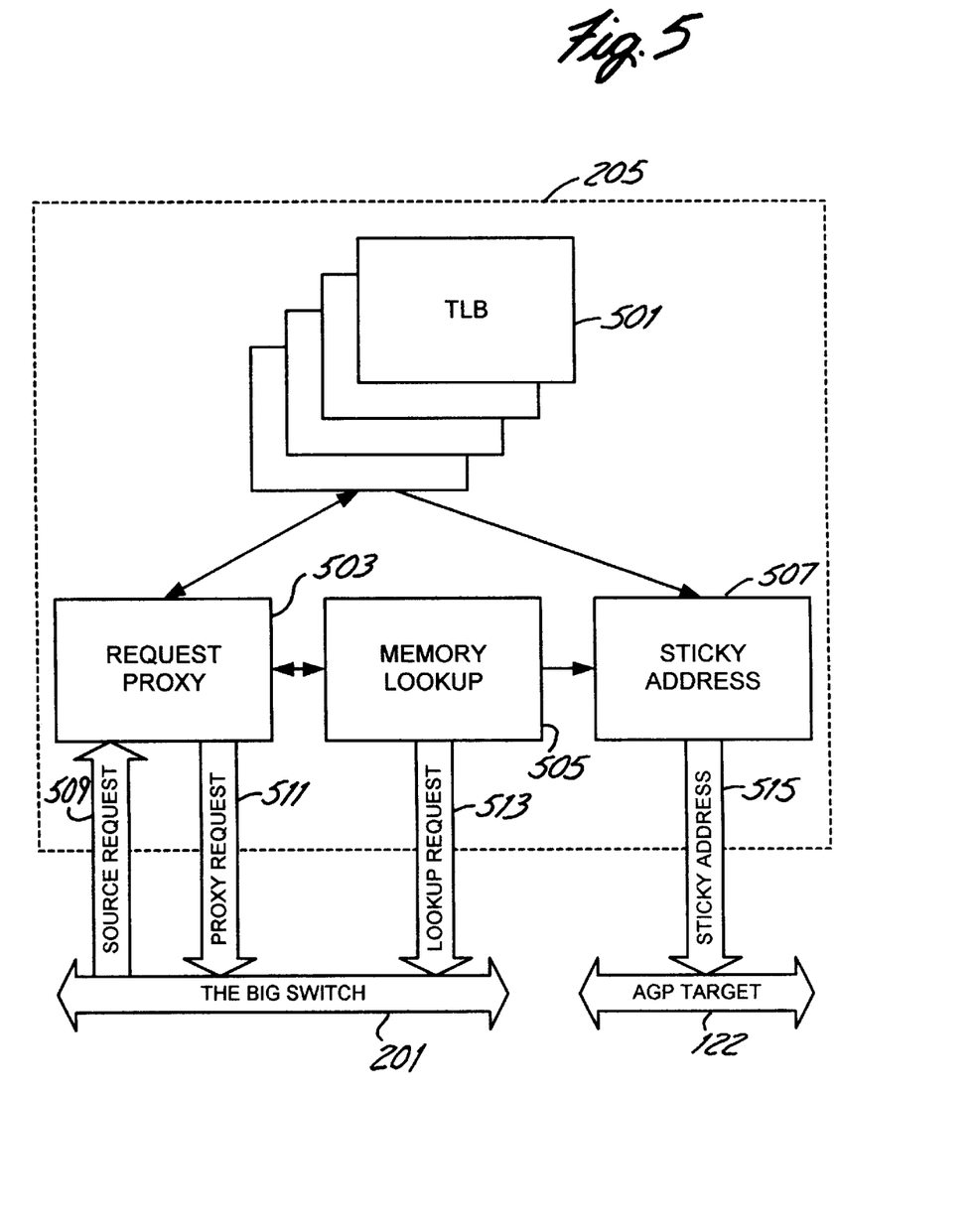
FIG. 5 is a block diagram of the address translator module having translation look-aside buffers.

FIG. 5 is a block diagram of the Address Translator 205 module described in connection with FIG. 2. In the embodiment shown, the Address Translator 205 includes one or more translation look-aside buffers (TLBs) 501 that are used for caching address information that has been previously retrieved from the remapping table in main memory. The Address Translator 205 also includes a request proxy module 503, a memory look-up module 505, and a sticky address module 507. The sticky address module 507 includes logic that enables data from consecutive addresses to be bursted over the AGP bus 201.

Figure 6:
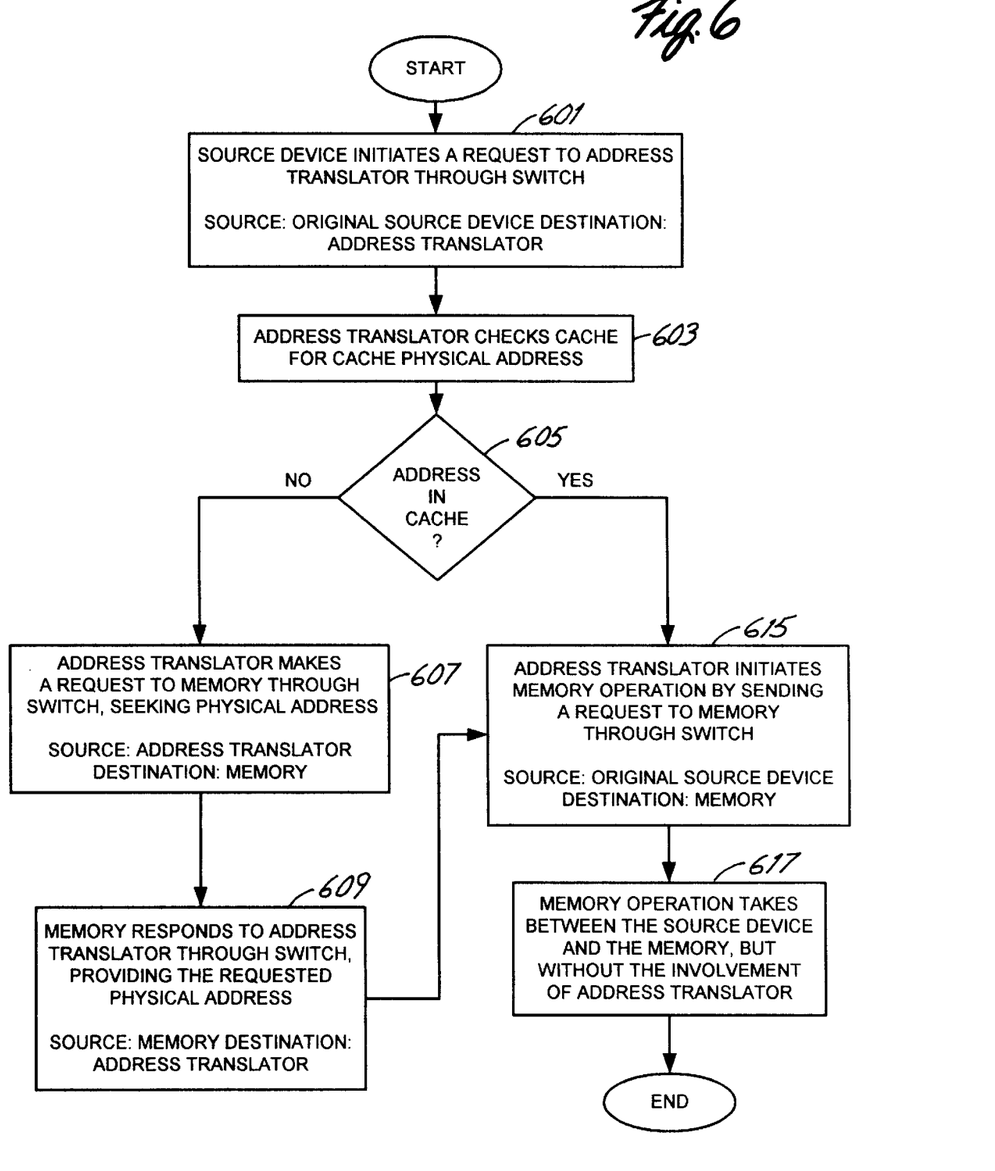
FIG. 6 is a flow chart illustrating the operation of a computer system having a central system controller and an address translator that includes translation look-aside buffers.

FIG. 6 is a flow chart illustrating the operation of the Address Translator 205 module in an embodiment of the present invention where translation look-aside buffers are used for caching virtual/physical address information. At step 601 in FIG. 6, an original source device initiates a request to the Address Translator 205 through the switch 201. In this request, the virtual address(es) involved in the operation are communicated to the Address Translator 205. The Address Translator 205 then accesses its cache at 603 in FIG. 6, seeking the physical address corresponding to the virtual address. In the embodiment of FIG. 5, the cache constitutes one or more translation look-aside buffers 501.

At 603, the Address Translator checks the translation look-aside buffers 501 to determine whether the physical address corresponding to the virtual address has been cached in the buffers 501. If at 605 the translation look-aside buffers do not have the corresponding physical address, the physical address is retrieved from memory at 607 and 609 in FIG. 6.

However, if it finds the corresponding physical address at 605, the Address Translator 205 does not need to access the remapping table in main memory 125. Instead, at 615, the Address Translator 205 retrieves the desired address from the cache, and then initiates the memory operation on behalf of the original source device by sending a request to the memory control module 207 through the switch 201. As shown at 615, this request identifies the original source device as the source, and the memory control module 207 as the destination. Control of the actual data transfer between the original source device and the memory control module 207 is passed seamlessly from the Address Translator 205 back to the original source device. Thereafter, the memory operation takes place at 617 between the original source device and the memory control module 207 without the involvement of the Address Translator 205.

The present invention is described herein in terms of an AGP- or PCI-based computer system, but it should be understood that the techniques and procedures disclosed herein can be applicable to other systems and architectures. Not all embodiments of the present invention are limited to an implementation based on the Accelerated Graphics Port an/or Peripheral Component Interconnect architecture. Further, although the present invention has been described principally in terms of a system controller interacting with other devices and modules within a computer system, the present invention is applicable to other contexts and environments, and is not necessarily limited to the particular environment(s) disclosed herein.

Although the present invention has been described in terms of certain embodiments, various changes and modifications, even if not shown or specifically described herein, are deemed to lie within the spirit and scope of the invention and the appended claims.

What is claimed is:

1. A computer comprising:
   (a) a bus;
   (b) a system controller connected to the bus so that it can access devices on the bus, wherein the system controller comprises a switch that receives transaction requests, wherein a transaction request includes a source device identification tag that identifies the source device of a transaction request and a destination device identification tag that identifies a destination device of a transaction request, wherein the switch routes each transaction request to the destination device identified by the destination device identification tag; and
   (c) a proxy device that is attached to the switch, and that has logic for sending a proxy transaction request to the switch, wherein the source device identification tag associated with the proxy transaction request identifies a substitute source device other than the proxy device as the source of the proxy transaction request.

2. The computer of claim 1, wherein the substitute source device and the destination device in the proxy transaction request include logic for carrying out the request without the involvement of the proxy device.

3. The computer of claim 2, wherein the proxy device is an address translator.

4. The computer of claim 3, wherein one destination device is a memory control module that can access through the bus a remapping table for translating virtual addresses into physical addresses.

5. The computer of claim 4, wherein the proxy transaction request sent by the proxy device requests that an operation involving a physical memory location be carried out, and wherein the memory control module accesses the physical memory location.

6. The computer of claim 5, wherein the address translator comprises a cache for storing physical addresses that correspond to virtual addresses.

7. The computer of claim 6, wherein the cache comprises translation look-aside buffers.

8. A computer comprising:
   (a) a processor connected to a host bus;
   (b) system memory connected to a memory bus;
   (c) a device connected to an expansion bus; and
   (d) a system controller connected to the host bus, the memory bus, and the expansion bus so that it can access devices on the host bus, the memory bus, and the expansion bus, wherein the system controller comprises:
      a switch that receives transaction requests, wherein the transaction requests include a source device identification tag that identifies the source device of a transaction request and a destination device identification tag that identifies the destination device of a transaction request, wherein the switch routes the transaction requests to the destination device identified by the destination device identification tag, and
      a proxy device that is attached to the system controller, and that has logic for sending a proxy transaction request to the switch, wherein the source device identification tag associated with the proxy transaction request identifies a substitute source device other than the proxy device as the source of the proxy transaction request.

9. The computer of claim 8, wherein the proxy device is an address translator.

10. The computer of claim 9, wherein the proxy device comprises:
    a cache for storing physical addresses that correspond to virtual addresses.

11. The computer of claim 10, wherein the system controller further comprises:

a first module comprising the substitute source device interface;

a second module comprising the destination device interface; and logic for carrying out the proxy transaction request without the involvement of the proxy device.

12. The computer of claim 11, wherein the substitute source device identified in a proxy transaction request is an AGP module.

13. The computer of claim 12, wherein one destination device is a memory control module that can access through the memory bus a remapping table for translating virtual addresses into physical addresses.

14. The computer of claim 13, wherein the proxy transaction request sent by the proxy device requests that an operation involving a physical memory location be carried out, and wherein the memory control module accesses the physical memory location.

15. A computer comprising:

a bus;

a system controller operably connected to the bus and having a switch to which one or more devices are operably connected, said switch having logic for receiving and processing a first transaction request wherein an original source device requests access to an original destination device by providing a transaction request that identifies itself as the source device and also identifies the original destination device;

a proxy facility in said system controller whereby at least one of the devices operably connected to the switch has logic for issuing a subsequent transaction request that identifies the original source device rather than the at least one device as the source and also identifies a subsequent destination device, and the switch processes the subsequent transaction request as an operation between the original source device and the subsequent destination device.

16. The system of claim 15 wherein in the first transaction request the original source device requests access to an address controller and in the subsequent transaction request the address controller specifies the original source device rather than itself as the source.

17. The system of claim 15 wherein in the first transaction request the original source device seeks from the address controller as destination device a physical address that corresponds to a virtual address and in the subsequent transaction request the address controller initiates a memory operation wherein the address controller initiates a request identifying the original source device as the source.

* * * * *